May 27, 1930.   F. W. KOSFELD   1,760,702
NUT TAPPING DEVICE
Filed Jan. 5, 1928   2 Sheets-Sheet 1
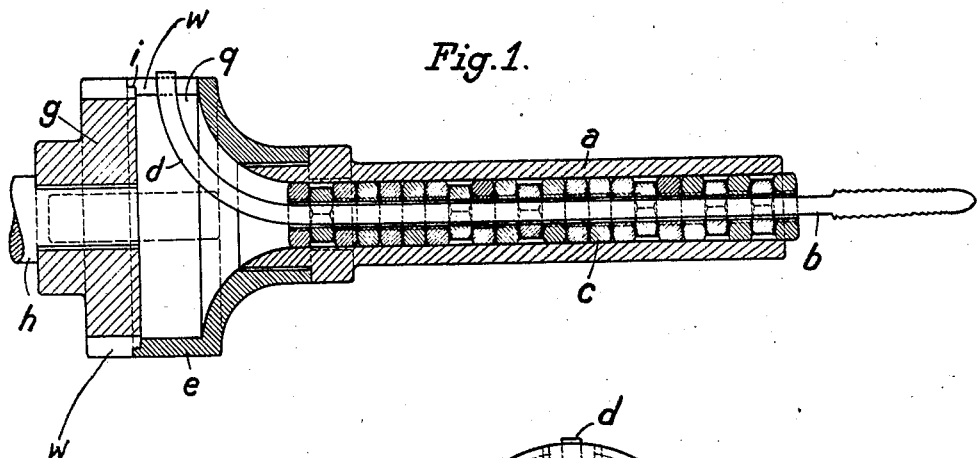
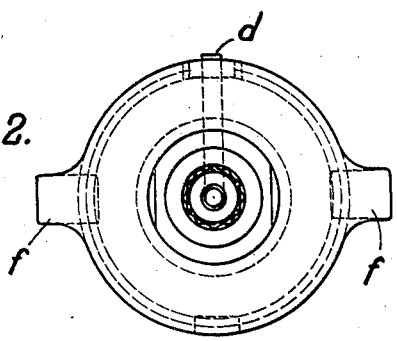
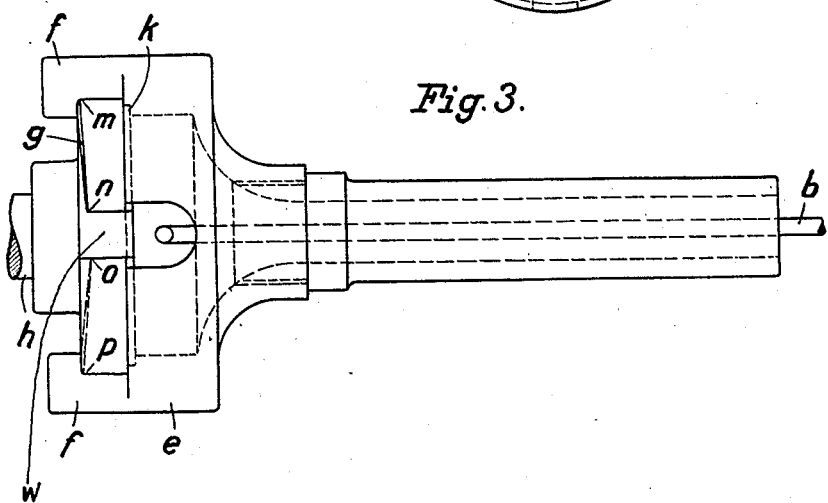
Inventor:
Friedrich Wilhelm Kosfeld
by his attorneys
Howson and Howson Inventor:
Friedrich Wilhelm Kosfeld
by his attorneys
Howson and Howson Patented May 27, 1930

1,760,702

UNITED STATES PATENT OFFICE

FRIEDRICH WILHELM KOSFELD, OF BRACKWEDE, GERMANY

NUT-TAPPING DEVICE

Application filed January 5, 1928, Serial No. 244,714, and in Germany January 31, 1927.

This invention relates to a tapping head for the cutting of female threads by means of an overflow tap having a curved shank and has for its object to facilitate the replacement of the cutter head as a whole upon its spindle, as well as the tap. To this end, the guide sleeve for the nuts when they reach the straight portion of the tap shank terminates in an open cup which receives the curved discharge end of the shank, the circumference of the said cup being provided with coupling claws for connecting it to a corresponding flange on the driving spindle. In order to enable the tapping head with the driving spindle to be rigidly centered on the spindle, the annular end face of the open cup is formed with a centering groove which engages a corresponding centering offset on the flange of the driving spindle. For the purpose of effecting coupling engagement between the driving claws of the open cup and the flange on the driving spindle, the rear face of the flange which comes into frictional engagement with the driving claws, is provided with wedge or tapered surfaces rising in the direction opposite to direction of rotation of the driving spindle. The tapping head may be used for tapping polygonal nuts as well as thumb-nuts and the like.

In the accompanying drawings

Figure 1 is a longitudinal section of the tapping head for tapping hexagonal nuts;

Figure 2 is an end view;

Figure 4:
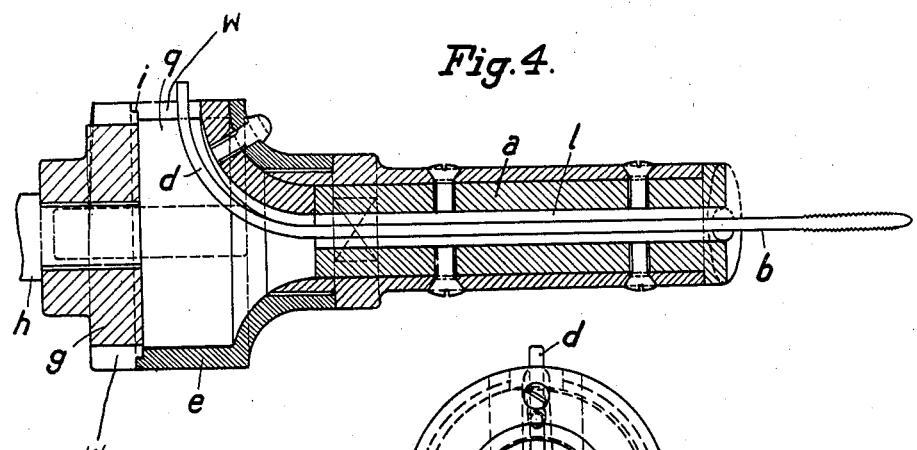
Figure 5:
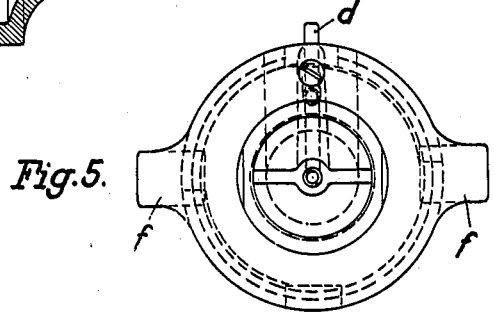
Figure 6:
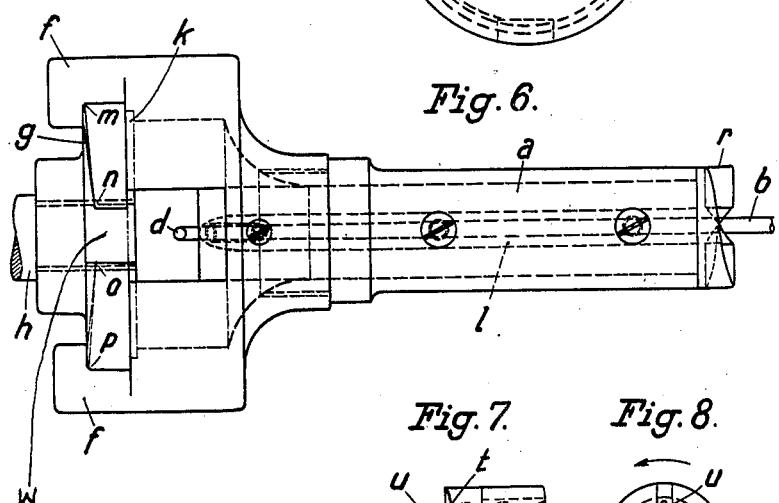
Figure 7:
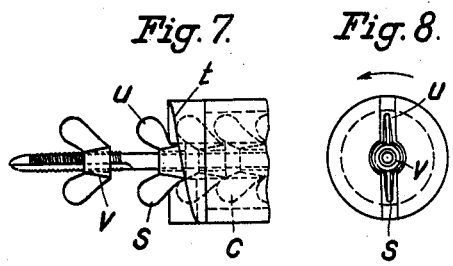
Figure 8:
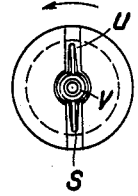

Figure 3 a side view thereof;

Figure 4 is a sectional view similar to Figure 1 of a modified head for tapping thumb-nuts;

Figures 5 and 6 are end view and side view thereof, similar to Figs. 2 and 3;

Figures 7 and 8 illustrate details.

Referring to the construction shown in Figs. 1 to 3 the tapping head comprises a sleeve $a$ adapted to receive the screw-tap $b$ and to guide the nuts $c$ arriving from the straight tapping end of the tap $b$ and a cup-shaped rear portion or cup $e$ adapted to accommodate the curved back end $d$ of the screw-tap $b$. The sleeve $a$ and the cup $e$ are firmly connected with each other in any suitable manner such as by interengaging threads. The free edge of the cup $e$ is provided with two diametrically arranged claws $f$ adapted to engage with an annular flange $g$ of the driving spindle $h$, by means of the claws $f$ passing through two diametrically opposed radial grooves $w$ in the flange and gripping the flange upon relative rotation of the flange and cup as will be seen in Fig. 3. To maintain the driving spindle $h$, cup $e$ and sleeve $a$ in coaxial relation, the annular end face of the cup is provided with centering groove $i$ with which engages a corresponding centering offset $k$ of the flange $g$ of the driving spindle $h$. The inner face of the flange $g$ which comes into frictional engagement with the claws $f$ is tapered to form a wedge face rising in the direction opposite to the direction of rotation as indicated in Fig. 3 by the oblique lines $m$, $n$, and $o$, $p$.

The advantage of the chucking arrangement is that for the purpose of replacing it is merely necessary to loosen the frictional engagement between the claws $f$ and the flange $g$ of the spindle by turning the claws in the direction of the spindle, thus enabling the easy removal of the chuck from the driving spindle. Then the overflow tap $b$, $d$, whether it be covered with nuts or not, can be readily drawn out from the sleeve $a$ through the open cup end. The curved end $d$ of the tap projects from the cup $e$ through an aperteure $q$ provided in the side wall of the cup and dimensioned to allow the threaded nuts $c$ to be ejected from the tap and through the said aperture due to the centrifugal action set up by the revolving spindle.

The modification illustrated in Figs. 4 to 8 is especially devised for use in tapping thumb-nuts. The several parts constituting the tool are the same as described with reference to Figs. 1 to 3, the main difference residing in the means for causing the tapped nuts $c$ to properly enter the front opening of the sleeve $a$ upon departure from the threaded end of the tap $b$, in order to subsequently move over and along the shaft of the latter towards the cup and the lateral aperture $q$ thereof.

To this end each winged nut upon leaving the threaded end of the tap $b$ is caused to occupy a certain position on the shaft of the tap which will enable the nut to pass through a slotted opening at the front end of the sleeve and further through the bore thereof which has a similar slotted cross-section or in other words, the cylindrical bore of the sleeve $a$ shown in Fig. 1 is reduced in the modification illustrated in Figs. 4 to 8 to a slightly greater diameter than the external diameter of the core $v$ of the thumb-nut, see Fig. 7, and this reduced bore is provided throughout with two diametrically opposed radial slots extending the full length of the sleeve, so that the nuts will pass therethrough in close succession and with their wings alined in the slots and their cores traveling in the bore of the sleeve, as shown in Fig. 7.

Now, for the purpose of directing and guiding a finished thumb-nut from the threaded end of the tap $b$ on and along the shaft of the latter into the slotted bore $l$ of the sleeve $a$, the free end face of the latter is shaped to form a stop, on the one side or on both sides, for the one wing of the nut and a guiding surface contiguous to the stop for guiding the other wing of the nut.

After a blank has been tapped by means of the threaded end of the tap, the nut thus produced moves on the projecting part of the shaft $b$. For the purposes of alining the wings with the two diametrical slots of the bore $l$ and with the wings of any nuts already introduced into the sleeve, the guiding stop $r$, provided either on one side or on both sides, will act to direct the wing $s$ of the nut, while the slanting guide-face $t$ continguous to the stop $r$ will act to direct the other wing $u$ towards the slot of the bore $l$, so that the nut will be properly positioned for entrance into the bore $l$. As the guide-face $t$ is shaped to decline in the direction of the revolution of the cutter head or tool, the root or base portion of the one wing of the nut will come, as soon as the tapped nut is discharged from the threaded end of the tap, in contact with the slanting face $t$ and will be guided on and along the face $t$, until the front face of the other wing of the nut, that is the face thereof running in front at the revolution, engages the guide-stop $r$, whereupon the nut, that is the core $v$ and the wings $s$, $u$ thereof, will be fed into the bore $l$ under the pressure of the next following nut.

What I claim is:

1. A chuck or head for tapping nuts and the like by means of a screw tap having a straight shaft with a curved rear end, comprising a sleeve for the straight part of the shaft to be housed therein, a cup-shaped member firmly connected with the said sleeve for the curved end of the shaft to be accommodated therein, said cup-shaped member having an open end whereby the tap may be removed axially when said cup-shaped member is disconnected from the drive shaft, holding means on a drive shaft, and means on said cup-shaped member cooperating with said holding means to connect the shaft with said cup-shaped member, whereby said screw tap is readily removable when the chuck is removed from the driving shaft.

2. A chuck or head for tapping nuts and the like by means of a screw tap having a straight shaft with a curved rear end, comprising a sleeve for the straight part of the shaft to be housed therein, a cup-shaped member firmly connected with the said sleeve for the curved end of the shaft to be accommodated therein, claws provided on the said cup-shaped member, and means on a driving shaft engaged by said claws for detachably engaging a driving shaft with the chuck, said screw tap being readily removable through said cup when the chuck is removed from the driving shaft.

3. A chuck or head for tapping nuts and the like by means of a screw tap having a straight shaft with a curved rear end, comprising a sleeve for the straight part of the shaft to be housed therein, a cup-shaped member firmly connected to the said sleeve for the curved end of the shaft to be accommodated therein, means for operatively connecting the said cup-shaped member with a driving shaft, said screw tap being readily removable when the chuck is removed from the driving shaft, a stepped annular groove in the face edge of the cup-shaped member, and an annular flange on the driving shaft having a corresponding circumferential shoulder adapted to engage in the said groove for centering purposes.

4. A chuck or head for tapping nuts and the like by means of a screw tap having a straight shaft with a curved rear end, comprising a sleeve for the straight part of the shaft to be housed therein, a cup-shaped member firmly connected to the said sleeve for the curved end of the shaft to be accommodated therein, coupling claws provided on the said cup-shaped member, an annular flange on a driving shaft adapted to co-operate with said claws for the coupling purpose, and a tapered end surface of the said flange adapted to engage with the said claws and forming a wedge or keying face ascending in the direction of the revolution of the driving shaft.

5. A chuck or head for tapping thumb-nuts by means of a screw tap having a straight shaft with a curved rear end, comprising a sleeve with a slotted bore or guide-way of a sectional shape similar to that of a thumb-nut, a cup-shaped member firmly connected with the said sleeve, means for operatively connecting the said cup-shaped member with a driving shaft, a guide-stop at the front end face of the said sleeve and a guiding surface contiguous to said guide-stop, adapted to guide thumb-nuts into the slotted bore or guideway of the sleeve.

6. A chuck or head for tapping nuts and the like by means of a screw tap having a straight shaft with a curved rear end, comprising a sleeve for the straight part of the shaft to be housed therein, a cup-shaped member firmly connected with the said sleeve for the curved end of the shaft to be accommodated therein, flange and claw means on said cup-shaped member and on a drive shaft forming a quickly detachable connection between said cup-shaped member and drive shaft.

In testimony whereof I have signed my name to this specification.

FRIEDRICH WILHELM KOSFELD.